US010826281B2

(12) United States Patent
Rahn et al.

(10) Patent No.: US 10,826,281 B2
(45) Date of Patent: Nov. 3, 2020

(54) GROUND BUS SUBASSEMBLIES, POWER DISTRIBUTION SUBASSEMBLIES, AND ASSEMBLY METHODS

(71) Applicant: Siemens Industry, Inc., Alpharetta, GA (US)

(72) Inventors: Megan Rahn, Dallas, TX (US); Jason Parkerson, Mansfield, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 240 days.

(21) Appl. No.: 16/118,140

(22) Filed: Aug. 30, 2018

(65) Prior Publication Data

US 2020/0076169 A1 Mar. 5, 2020

(51) Int. Cl.
*H02G 5/00* (2006.01)
*H02B 1/20* (2006.01)
*H02B 1/01* (2006.01)
*H02B 1/30* (2006.01)
*H01R 4/34* (2006.01)

(52) U.S. Cl.
CPC ............. *H02B 1/20* (2013.01); *H02B 1/012* (2013.01); *H02B 1/301* (2013.01); *H02B 1/306* (2013.01); *H02B 1/308* (2013.01); *H01R 4/34* (2013.01)

(58) Field of Classification Search
CPC .......... H02B 1/20; H02B 1/012; H02B 1/301; H02B 1/308; H02B 1/306; H02G 3/08; H02G 3/081; H02G 1/14; H02G 5/02; H02G 5/06; H02G 5/025; H02G 5/00; H01R 13/621; H01R 13/40; H01R 13/516; H01R 13/53; H01R 4/34

USPC ............ 174/68.2, 50, 520, 68.3, 70 B, 71 B, 174/88 B, 99 B, 129 B, 133 B, 149 B, 174/72 B; 361/600, 601, 611, 624, 637, 361/648, 679.01, 775
See application file for complete search history.

(56) References Cited

U.S. PATENT DOCUMENTS

| | | | |
|---|---|---|---|
| 4,740,864 A | 4/1988 | Stanfield et al. | |
| 6,040,976 A | 3/2000 | Bruner et al. | |
| 6,111,745 A | 8/2000 | Wilkie et al. | |
| 6,169,248 B1 | 1/2001 | Rowe et al. | |
| 6,392,141 B1 * | 5/2002 | Smith | H02B 1/202 174/497 |
| 6,435,888 B1 | 8/2002 | Reed | |
| 6,781,818 B2 * | 8/2004 | Josten | H02B 1/21 361/611 |
| 6,870,103 B1 * | 3/2005 | Wiant | H02G 5/007 174/68.2 |
| 6,878,891 B1 | 4/2005 | Josten et al. | |
| 6,888,066 B1 | 5/2005 | Wiant et al. | |
| 7,334,315 B2 | 2/2008 | Wiant et al. | |
| 7,449,635 B2 | 11/2008 | Wiant | |
| 8,437,118 B2 | 5/2013 | Kasza et al. | |
| 8,717,741 B2 | 5/2014 | Valenzuela | |

(Continued)

*Primary Examiner* — Angel R Estrada (57) ABSTRACT

A ground bus subassembly provided at a top (e.g., top front) of a power distribution cabinet section. The ground bus subassembly includes a first upper front frame plate, and a first ground bus section adjacent to the first upper front frame plate. A splice can attach to the first ground bus section. A ground cover covering the first ground bus section can function as a hoist rail. Ground bus subassemblies with first and second cabinet sections and first and second ground bus sections are provided, as are methods of assembly of ground bus subassemblies.

14 Claims, 11 Drawing Sheets

(56) References Cited

U.S. PATENT DOCUMENTS

| | | |
|---|---|---|
| 9,144,161 B2 | 9/2015 | Kozuru et al. |
| 9,391,413 B2 | 7/2016 | Blasbalg et al. |
| 9,608,413 B2 | 3/2017 | Kubota et al. |
| 9,705,294 B2 | 7/2017 | Kubota et al. |
| 10,418,751 B1 * | 9/2019 | Parkerson ............ H01R 13/621 |
| 10,498,112 B1 * | 12/2019 | Wiant .................... H02G 5/007 |

* cited by examiner

FIG. 3

# GROUND BUS SUBASSEMBLIES, POWER DISTRIBUTION SUBASSEMBLIES, AND ASSEMBLY METHODS

FIELD

The present disclosure relates to apparatus, assemblies, and methods for electrical power distribution, and specifically to power distribution subassemblies containing a ground bus.

BACKGROUND

Power distribution assemblies (e.g., switchgear and switchboard assemblies) may be fabricated as partial units or in cabinet sections, referred to as shipping splits. The shipping splits are assembled at the final destination of the power distribution assembly. In a continuous effort to miniaturize and include more control components (e.g., circuit breakers) within such power distribution assemblies, space envelope for achieving this becomes very challenging.

Therefore, there is a need for improvements to various components of power distribution assemblies to be able to contain more control components and improve ease of assembly thereof.

SUMMARY

According to a first aspect, a ground bus subassembly is provided. The ground bus subassembly includes a first upper front frame plate, and a first ground bus section coupled to the first upper front frame plate.

According to another aspect, a ground bus subassembly is provided. The ground bus subassembly includes a first cabinet section including an first upper front frame plate secured to first frame portions; a second cabinet section including a second upper front frame plate secured to second frame portions; a first ground bus section coupled to the first upper front frame plate; and a second ground bus section coupled to the second upper front frame plate.

In another aspect, a method of assembly of a ground bus subassembly is provided. The method includes providing a first cabinet section including a first upper front frame plate coupled to frame members; and coupling a first ground bus section to a top of the first upper front frame plate.

Still other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

DETAILED DESCRIPTION

Reference will now be made in detail to the example embodiments of this disclosure, which are illustrated in the accompanying drawings. Power distribution assemblies, including switchgears and switchboards, may distribute electric power to a plurality of different subsystems, locations, and/or devices. For example, an input of a power distribution assembly may be connected to a main power line, such as the main power line to a building. The power distribution assembly may include electrical circuits and the like that distribute power to a plurality of locations, such as different floors or areas in a building or to different pieces of heavy equipment. Current flow through the power distribution assembly may normally be thousands of amperes (e.g., continuous current ratings of up to 5,000 A or even 6,000 A or more), but may be 100 kA or even 150 kA or more when under a fault condition, such as a short circuit. In some embodiments, the power distribution assembly may monitor current flow to the different locations and may include circuit breakers as control components to disconnect power to locations that draw current in excess of a predetermined amperage. Efforts are being made to miniaturize components and to allow more control components (e.g., breakers and the like) per cabinet section, which makes packaging of such components and subcomponents very challenging.

Power distribution assemblies may be fabricated in panelized structures that may include a plurality of cabinet sections. The front of the panel structures may include the control components, such as circuit breakers and/or monitoring devices. In order to conserve space in facilities, the interior of the power distribution assemblies may be densely packed with control components (e.g., circuit breakers, buses (e.g., horizontal, vertical, and runover buses), cables and connection terminals, and other components). Cables and associated terminal assemblies that distribute power to the different locations may be accessible to users from behind the front panel portions of the cabinet sections of the panel structures. However, ground bus connections have previously been less accessible, especially in enclosures that are designed to be pushed against the wall.

The power distribution assemblies may be fabricated in sections or splits (e.g., shipping splits). Two or more shipping splits (e.g., cabinet sections) may be manufactured at an assembly plant and shipped to a final destination. The shipping splits may then be coupled together at the final destination to form a line-up, which constitutes a power distribution assembly. Conductors in the individual shipping splits can be spliced together when the individual shipping splits are located side-by-side. Prior art splice locations may be located within the tight confines of the interiors of shipping splits, which can make accessing the splices difficult, especially ground buses.

In order to make ground bus connections more accessible and to provide more internal space envelope for control components, embodiments of the disclosure provide ground bus sections located on a top (e.g., top front) of the respective cabinet sections. Connection of the various ground bus sections can be readily assessed by an installer. Similarly, ground bus terminal connections are readily assessable from behind top front panels. Ground bus subassemblies that are configured for top mounting in respective cabinet sections are disclosed in FIGS. 1-3 herein. These configurations of ground bus subassemblies of power distribution assembly disclosed herein enable users to readily access and ground bus components within tight confines of power distribution assemblies.

Figure 1:
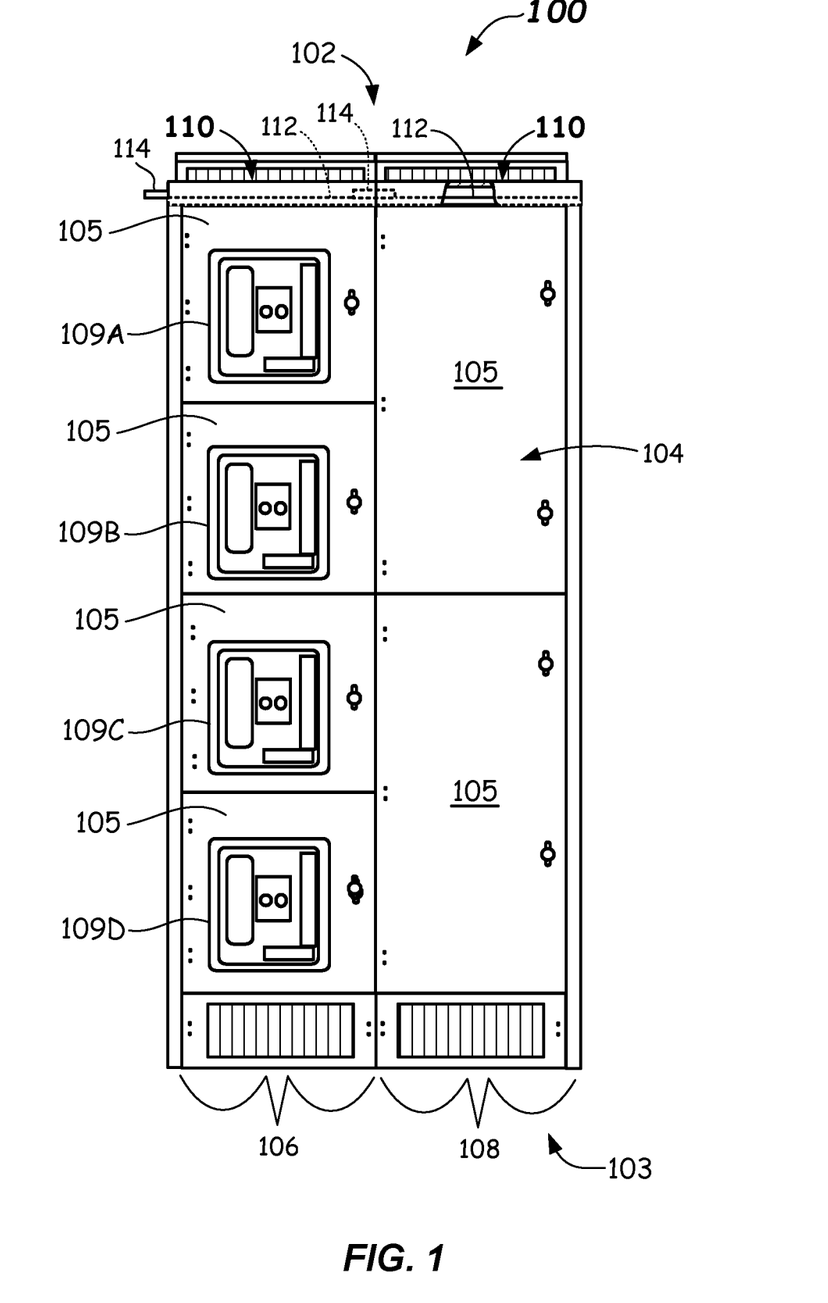
FIG. 1 illustrates a front elevation view of an exterior of a power distribution subassembly including a ground bus subassembly according to one or more embodiments of the disclosure.

Reference is now made to FIG. 1, which illustrates a front view of an example embodiment of an assembled power distribution assembly 100. The power distribution assembly 100 may comprise a switchgear or a switchboard. The power distribution assembly 100 may include a top 102, a bottom 103 opposite the top 102, and a front 104 including a plurality of panels 105. The panels 105 can be removable or pivotable like a door. The assembled power distribution assembly 100 may include multiple cabinet sections, such as first cabinet section 106, and second cabinet section 108, arranged in a side-to-side orientation. Panels 105 may provide internal access to the confines of the first cabinet section 106 and second cabinet section 108. Although not shown, other numbers of cabinet sections may be assembled with one another, such as 3 or more cabinet sections.

A first subset of the panels 105, such as in the first cabinet section 106, may include control components 109A-109D, which may include circuit breakers and/or other controllers to control and/or monitor power distribution to different locations and devices connected to the power distribution assembly 100. The components within, on or behind the panels 105 of the first cabinet section 106 may be collectively referred to as the "circuit breaker section" and may include electrical components (e.g., buses) that directly electrically couple to or are interconnected to the control components 109A-109D. In the embodiment depicted in FIG. 1, the panels 105 of the first cabinet section 106 may be vertically aligned. In the depicted embodiment, four control components 109A-109D including circuit breakers are stacked vertically.

A second group of panels 105 in the second cabinet section 108 may have contained behind them terminal assemblies, bus assemblies, cables, and the like that electrically connect the power distribution assembly 100 to locations where power is distributed, such as locations in a building and power equipment. The second group of panels 105 may also contain behind them buses carrying line power. These panels 105 of the second cabinet section 108 and the components behind them are collectively referred to as the "cable pull section." In the embodiment depicted in FIG. 1, the plurality of panels 105 of the cable pull section may be vertically aligned. The circuit breaker section may be adjacent to and abut the cable pull section.

The panels 105 may be capable of being opened or removed to enable a user access within the various cabinet sections 106, 108. The power distribution assembly 100 may be fabricated at a manufacturing facility as a first shipping split comprising the first cabinet section 106 and a second shipping split comprising the second cabinet section 108. Other embodiments of the power distribution assembly 100 may include more than two shipping splits. The first shipping split and the second shipping split may be coupled together at the final destination of the power distribution assembly 100. One or more panels 105 may be opened so that a user may access buses, terminals, and conductors located between the first shipping split and the second shipping split.

Referring now to FIGS. 1 and 2A-2C, each of the respective cabinet sections 106, 108 include a ground bus subassembly 110. The ground bus subassembly 110 for each of the first and second cabinet sections 106, 108 are located on the top 102 of the power distribution assembly 100, such as at the top front thereof. Each ground bus subassembly 110 includes a ground bus section 112. The ground bus section 112 can be a straight section of conductive bar (e.g., copper bar) acting as an electrical ground conductor. In some embodiments, the ground bus section 112 can be made up of multiple layers or stacks of conductors oriented one over the other. Holes may be provided along the length of each ground bus section 112 to facilitate bonding attachment thereof and connection of one or more grounds thereto.

The respective adjacent ground bus sections 112 can be coupled end-to-end with one another, such as with a splice 114. The splice 114 can be a short section of bar of the same electrically conductive material as the ground bus. In some embodiments, the splice 114 may be made up of multiple layers stacked vertically.

Each of the ground bus subassemblies 110 further includes an upper front frame plate 115, wherein the ground bus section 112 is coupled to the upper front frame plate 115. Because of the location of the ground bus section 112 at the top front, connection thereto can be easily made. Furthermore, in some embodiments, the ground bus section 112 is located outside of the confines of the interior of the cabinet section 106, 108, thus providing less internal obstructions for access to other components (e.g., buses, cables, terminals, and the like). Multiple ground bus subassemblies 110 can be assembled into a larger subassembly 210 including two or more ground bus subassemblies 110.

Additional reference is now made to FIGS. 2A-2G, which illustrate, in more detail and in isolation in FIGS. 2D-2G (with other components removed for clarity), the grounding bus subassemblies 110 for one or more cabinet sections, such as cabinet sections 106 and 108. As shown, the cabinet sections 106, 108 can include a frame 216 that can comprise multiple frame members, such as front vertical frame members 216V and horizontal frame members 216H. Front vertical frame members 216V and horizontal frame members 216H of each cabinet section 106, 108 may be coupled to one another by direct fastening or through an intermediate bracket that each member connects to. The cabinet sections 106, 108 can further include mid frame members 216M (FIGS. 2C and 2D) that are positioned between rear frame members 216R and the front vertical frame members 216V. The frame members 216V, 216H, 216M, 216R, and the upper front frame plate 115 may be metal, such as a galvanized metal, and may comprise bent components.

The cabinet sections 106, 108 can each further include ventilation components 218A, 218B at the top 102 of the cabinet section 106, 108. The grounding bus subassemblies 110 can be located forward of (in front of) the ventilation components 218A, 218B. Horizontal bus bars 220 and vertical bus bars 222 are shown running respectively horizontally and vertically along the rear of the cabinet section 106. Cabinet sections 106, 108 can include partial or full sides, which have been removed for illustration purposes. The respective adjacent vertical frame members 216V and horizontal frame members 216H of each cabinet section 106, 108 can be fastened together at one or more locations. For example, adjacent front vertical frame members 216V, mid frame members 216M, and/or rear frame members 216R can be coupled together by fasteners (e.g., bolts, screws, or the like).

Figure 2A:
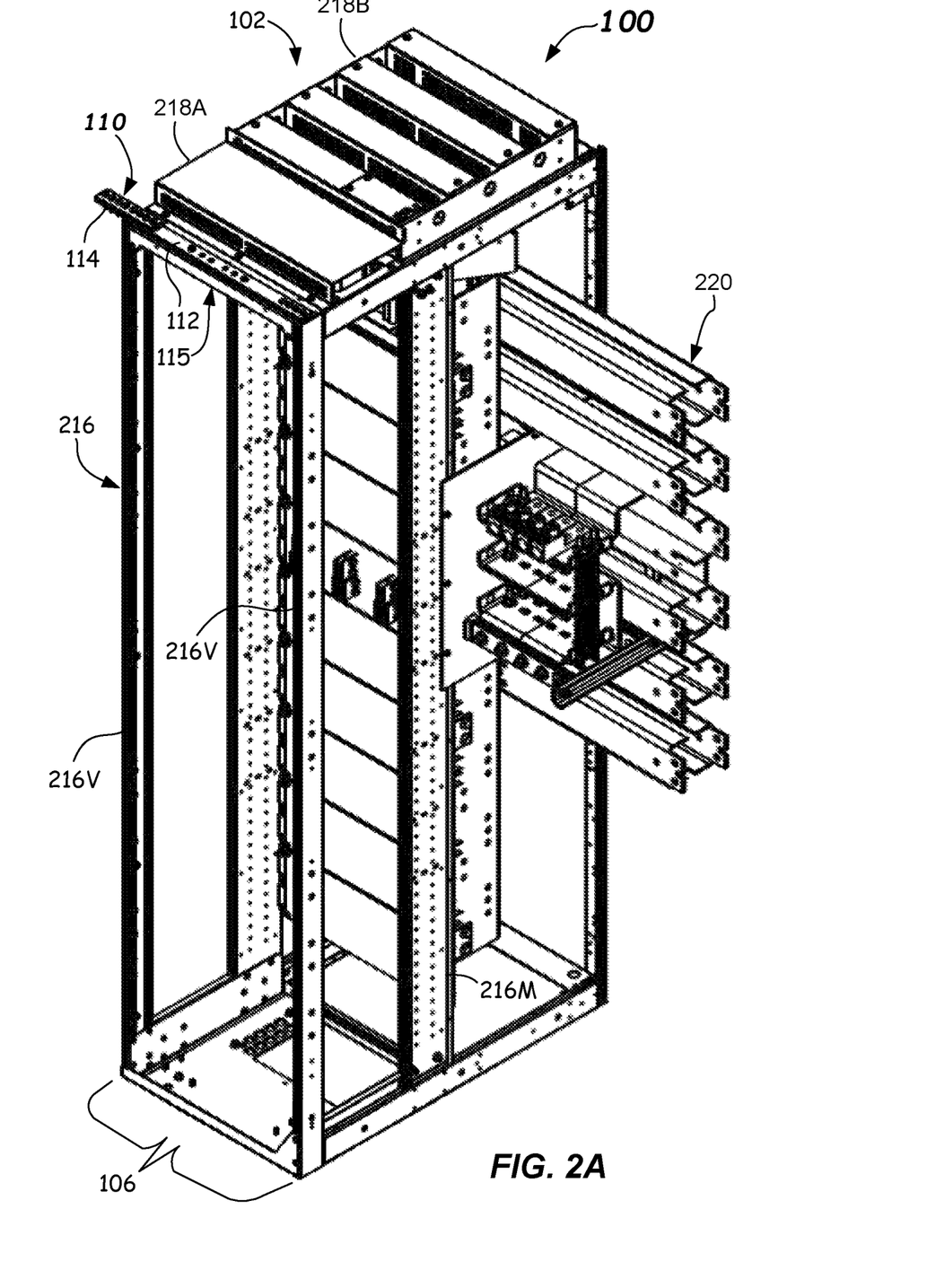
FIG. 2A illustrates a perspective view of a ground bus subassembly coupled to frame members of a cabinet section of a power distribution subassembly according to embodiments of the disclosure.
Figure 2B:
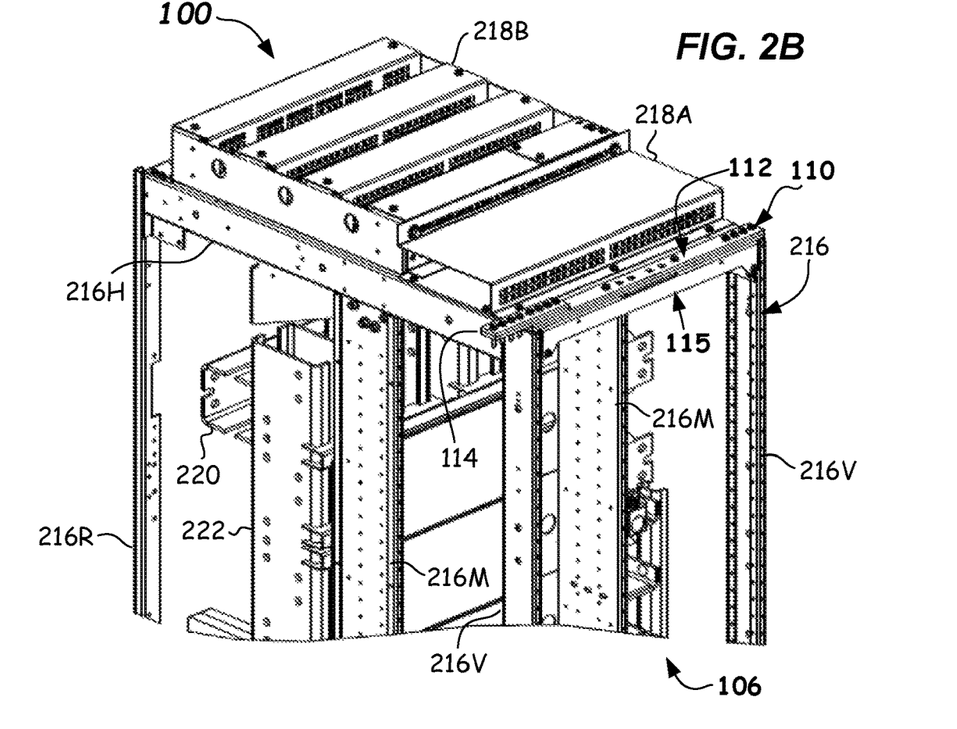
FIG. 2B illustrates perspective view of an uncovered ground bus subassembly of a power distribution cabinet section according to embodiments of the disclosure.
Figure 2C:
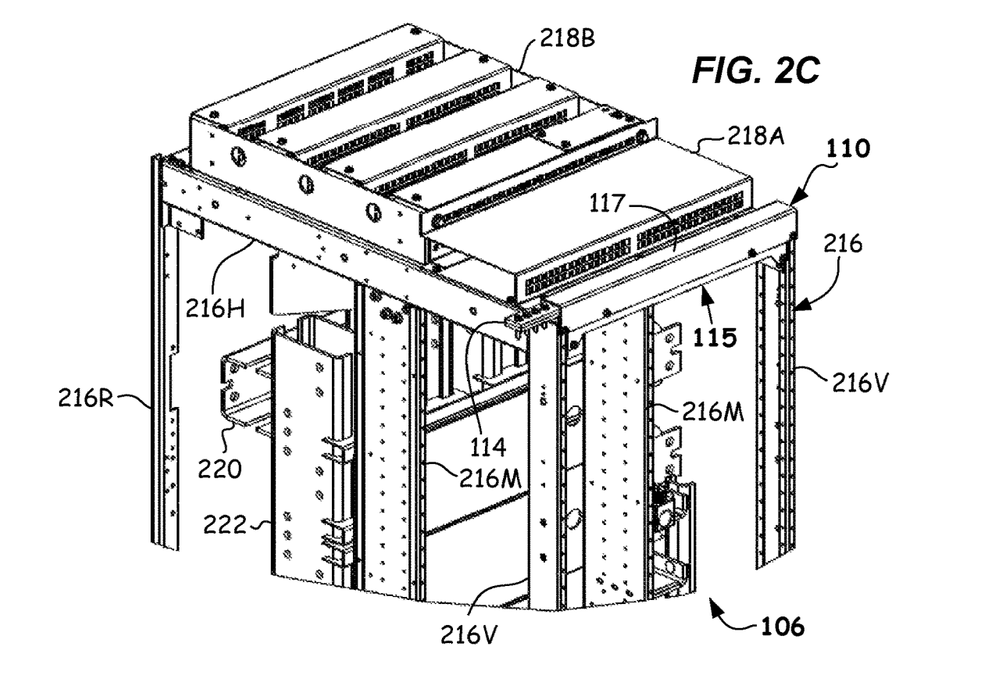
FIG. 2C illustrates perspective view of a covered ground bus subassembly of a power distribution cabinet section according to embodiments of the disclosure.
Figure 2D:
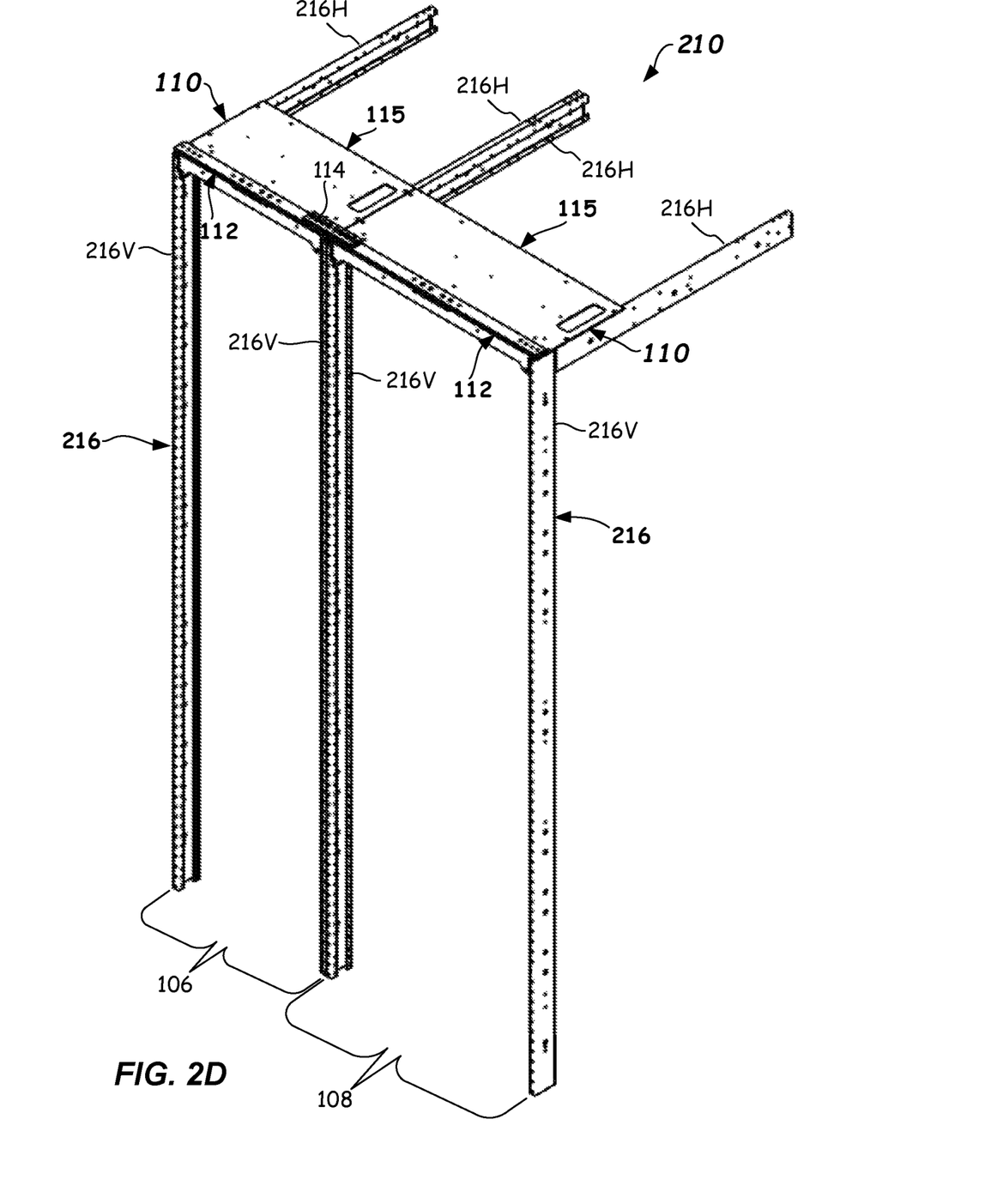
FIG. 2D illustrates perspective view of an un-covered larger ground bus subassembly coupled to frames of multiple power distribution cabinet sections according to embodiments of the disclosure.
Figure 2E:
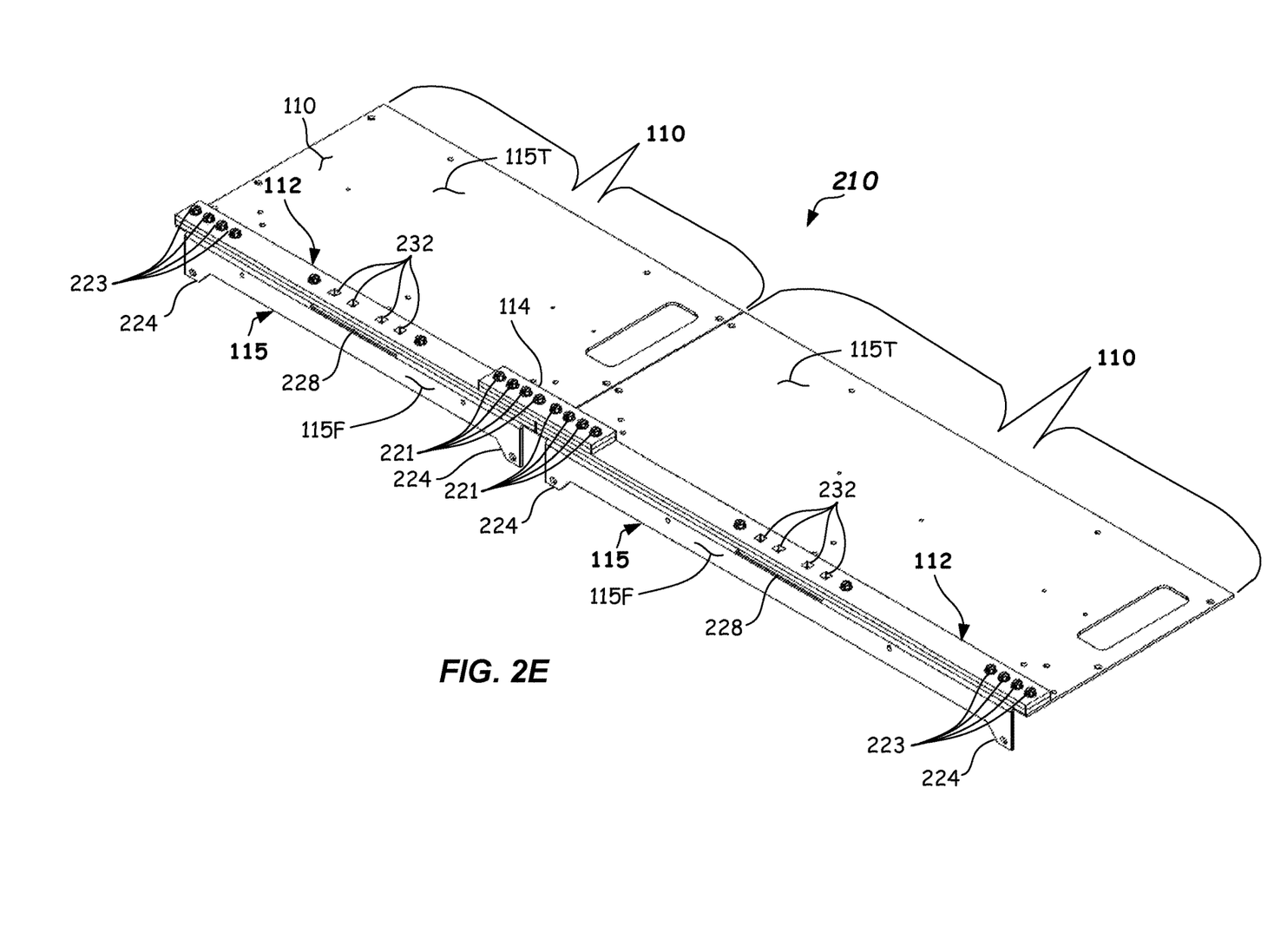
FIG. 2E illustrates perspective view of an un-covered larger ground bus subassembly containing an assembly of two ground bus subassemblies according to embodiments of the disclosure.
Figure 2F:
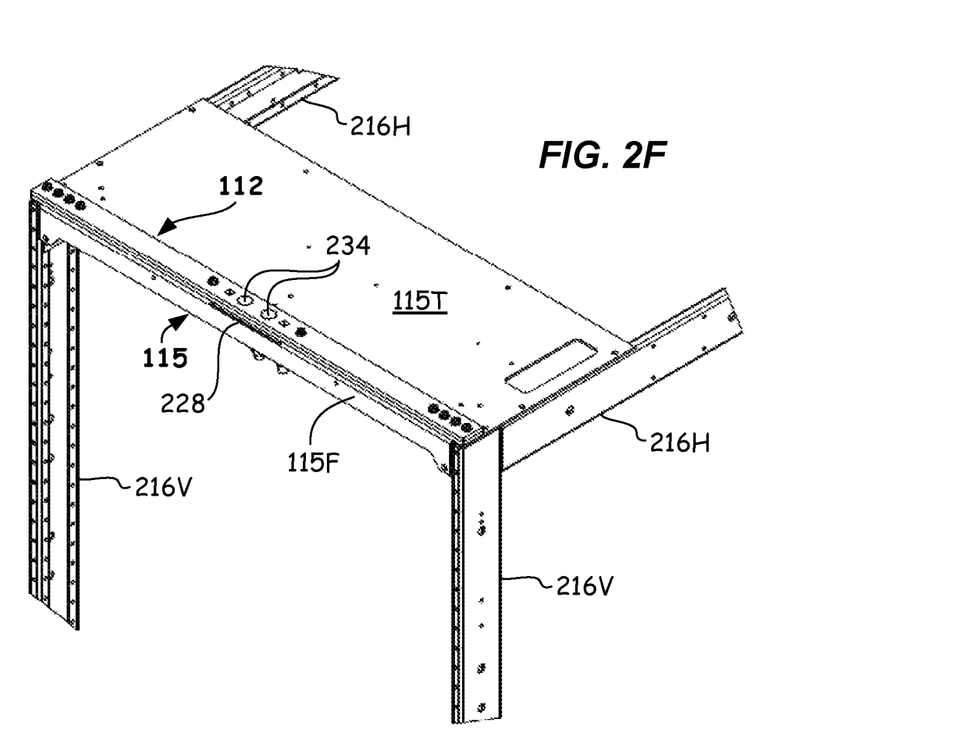
FIG. 2F illustrates perspective top view of a ground bus subassembly coupled to frames of a power distribution cabinet section and illustrating connection of a ground terminal to features of the ground bus section according to embodiments of the disclosure.
Figure 2G:
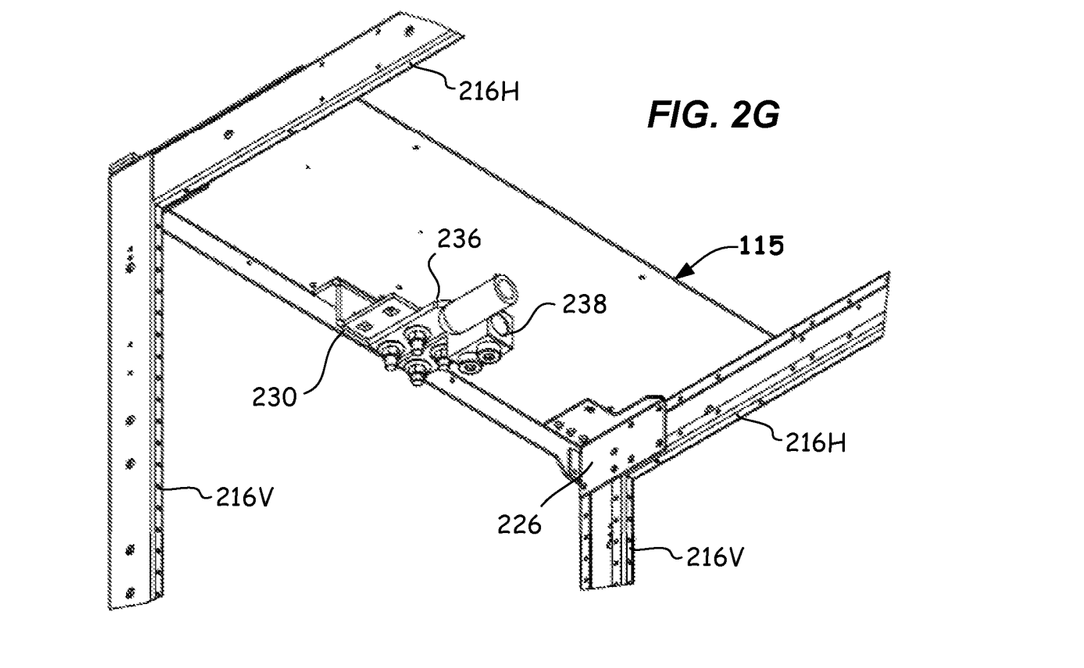
FIG. 2G illustrates perspective underside view of a ground bus subassembly illustrating connection of a ground terminal and respective cable connector and/or terminal blocks according to embodiments of the disclosure.
Figure 2H:
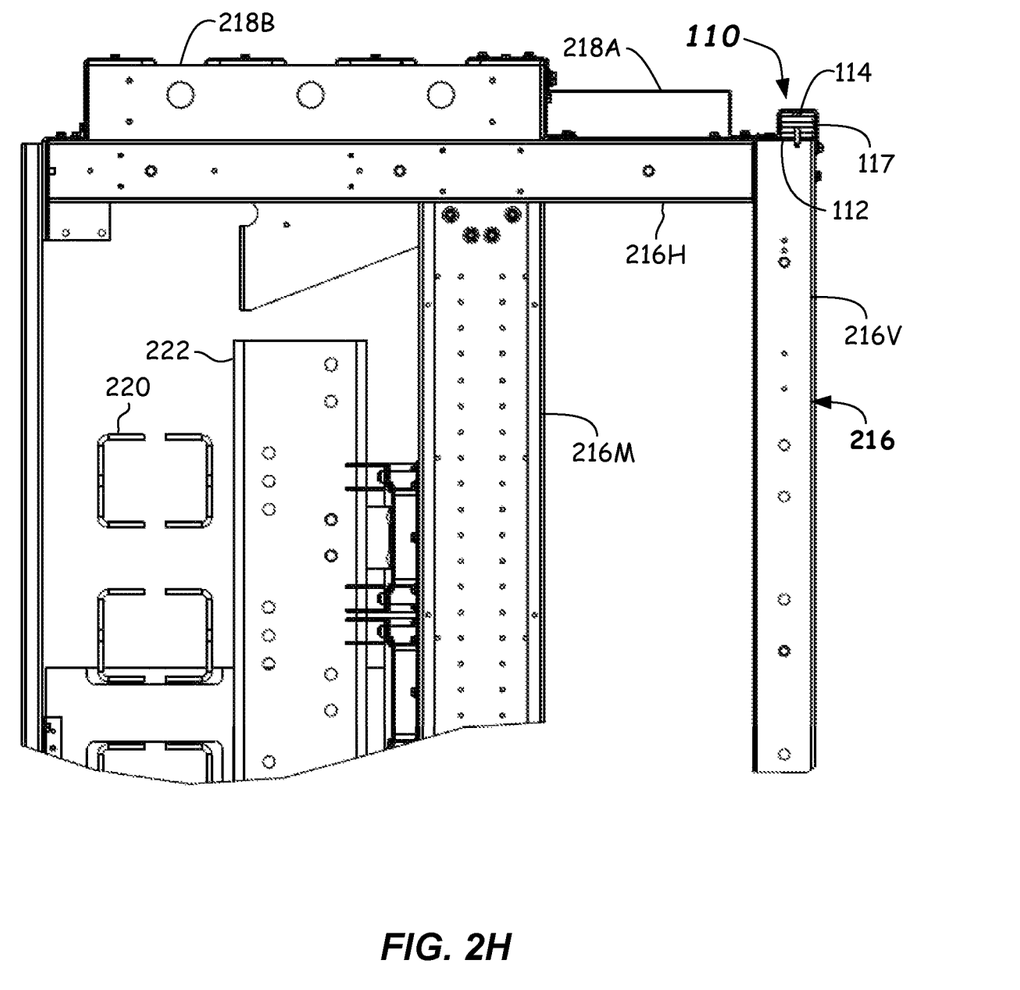
FIG. 2H illustrates side plan view of a ground bus subassembly illustrating connection with frame members according to embodiments of the disclosure.
Figure 2I:
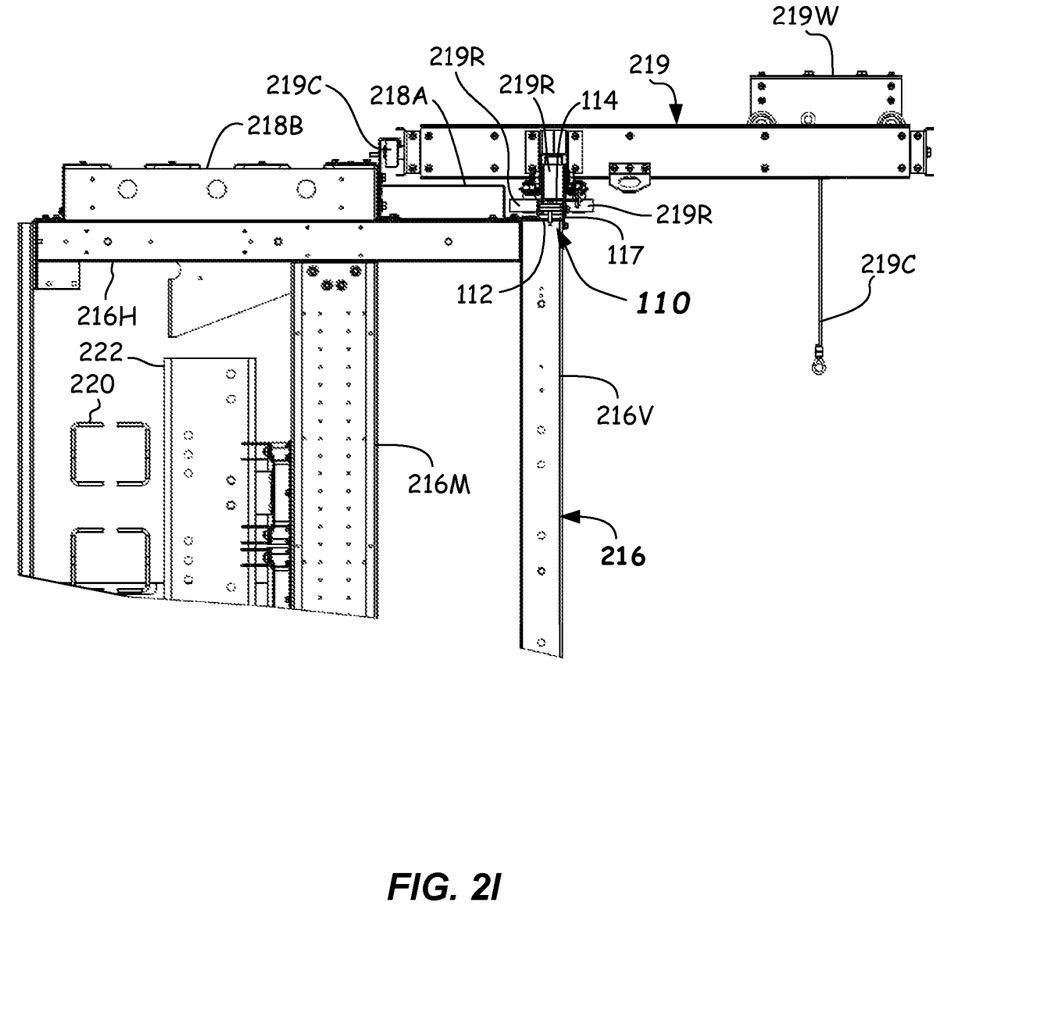
FIG. 2I illustrates side plan view of a hoist supported on a ground cover (functioning as a hoist rail) of the ground bus subassembly according to embodiments of the disclosure.

Reference is now made to FIGS. 2D-2I, which illustrate a ground bus subassembly 110 by itself (FIGS. 2F-2G) and also an embodiment of a larger ground bus subassembly 210 including two side-by-side ground bus subassemblies 110. Both illustrations have most of the surrounding support structure and internal components removed for illustration purposes. Each ground bus subassembly 110 comprises an upper front frame plate 115, and a ground bus section 112 coupled to the upper front frame plate 115. As shown in FIGS. 2H and 2I, a ground cover 117 (and in perspective view in FIGS. 2L and 2M) can be provided that covers one or more of the ground bus sections 112. The ground cover 117 can cover an entire length of each ground bus section 112. The ground cover 117 is configured to support a hoist 219 thereon, such as shown in FIG. 2I, and thus functions as a hoist rail. The hoist 219 can have a winch 219W a connection cable 219C, and rollers 219R that ride on one or more smooth sides of the ground cover 117. In the illustrated embodiment, the hoist 219 rides along on the respective smooth sides and top of the ground cover 117. Other rollers 219R may be provided elsewhere to counterbalance the hoist mass and load. The hoist 219 can be used for lifting and as an aid for positioning components (e.g., circuit breakers, and the like) within the cabinet sections 106, 108.

The ground bus subassembly 110 can further include a splice 114 coupled to at least one end of the each ground bus sections 112. For example, splice 114 in FIG. 2E couples two ground bus sections 112 together at one end of each. The other ends of the ground bus sections 112 can be attached to the respective upper front frame plates 115 by fasteners 223.

For example, the upper front frame plate 115 can include a top surface 115T and a front surface 115F, oriented at approximately 90 degrees to one another. The ground bus sections 112 and the splice 114 can be attached to the top surface 115T, such that the ground bus sections 112 extend laterally across the top surface 115T of the upper front frame plate 115, such as at the front thereof. The front surface 115F can include tabs 224 that can be attached to the front vertical frame members 216V or to brackets coupled to the frame members vertical frame members 216V and/or horizontal frame members 216H, or both. The sides of the top surface 115T of the upper front frame plate 115 can be coupled to the horizontal frame members 216H.

The splice 114 is coupled to the respective ground bus sections 112 by fasteners 221 passing through holes in the splice 114 which secures respective ground bus sections 112 to the respective top surfaces 115T of the upper front frame plates 115. For example, fasteners 221 can pass through the splice 114, a first ground bus section 112, a second ground bus section 112, and can be secured to a first upper front frame plate 115 and a second upper front frame plate 115 arranged side-by-side. Fasteners 221 can be secured by passing through the upper front frame plates 115 and threaded into a corner bracket 226 that can be attached to one of the vertical or horizontal frame members 216V, 216H, or to both.

Fasteners 221 can be self-tapping screws or optionally bolts that thread into captive nuts or other threaded features provided on the respective upper front frame plates 115, such as on the underside thereof or on corner bracket 226 (see FIG. 2G). In some embodiments, a splice 114 can be coupled to two ends of a ground bus section 112 (See the central ground bus section 112 shown in FIG. 2M). In particular, a first splice 114 can be directly coupled to a first end of a first ground bus section 112 and to a first side of the first upper front frame plate 115 and a second end the first ground bus section 112 can be directly coupled to a second splice 114 and to a second side of the upper front frame plate 115 by fasteners 221.

Figure 2J:
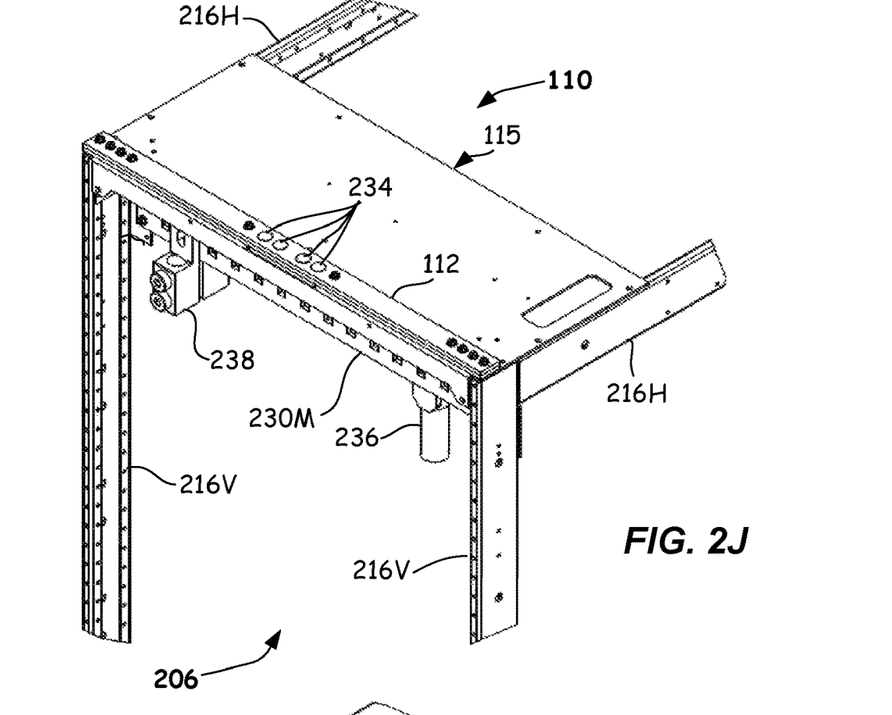
FIGS. 2J and 2K illustrate perspective top and underside views of a ground bus subassembly illustrating alternate ground terminal connections according to embodiments of the disclosure.
Figure 2K:
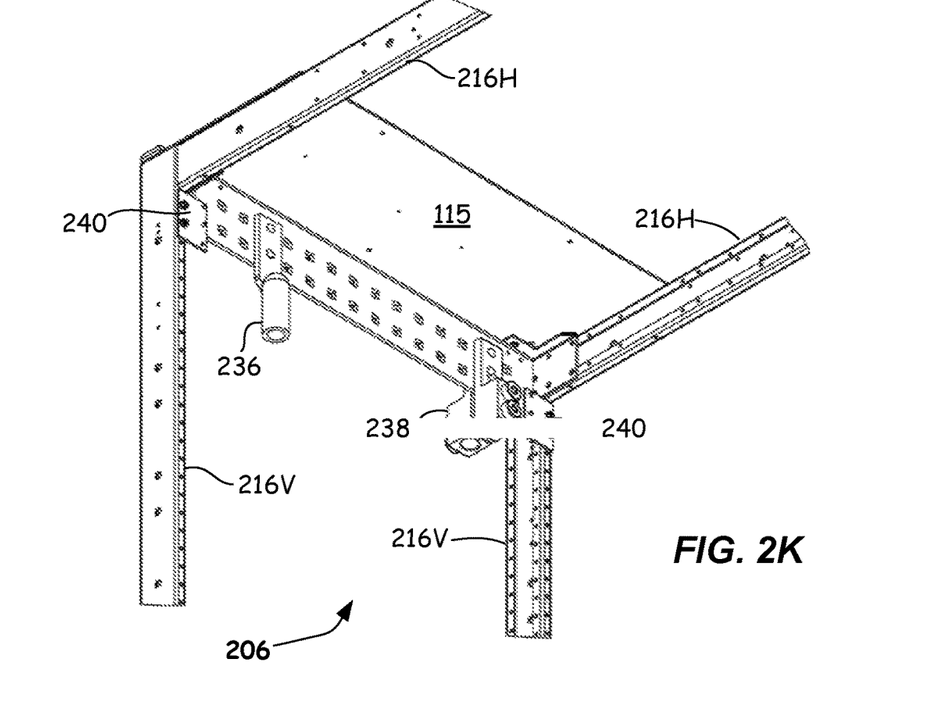
Figure 2L:
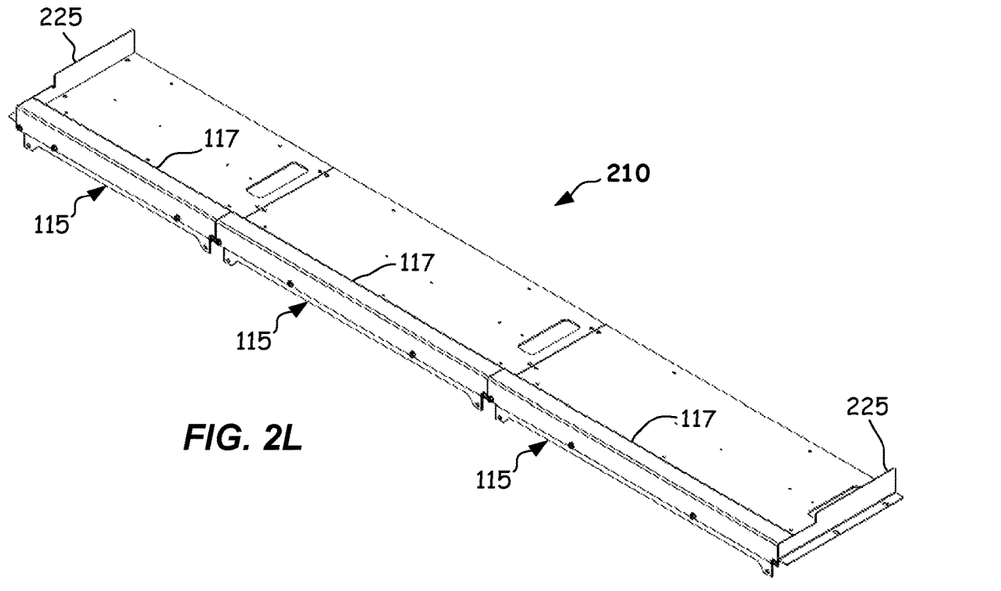
FIGS. 2L and 2M illustrate perspective top and exploded views of a ground bus subassembly illustrating multiple interconnected ground bus sections according to embodiments of the disclosure.
Figure 2M:
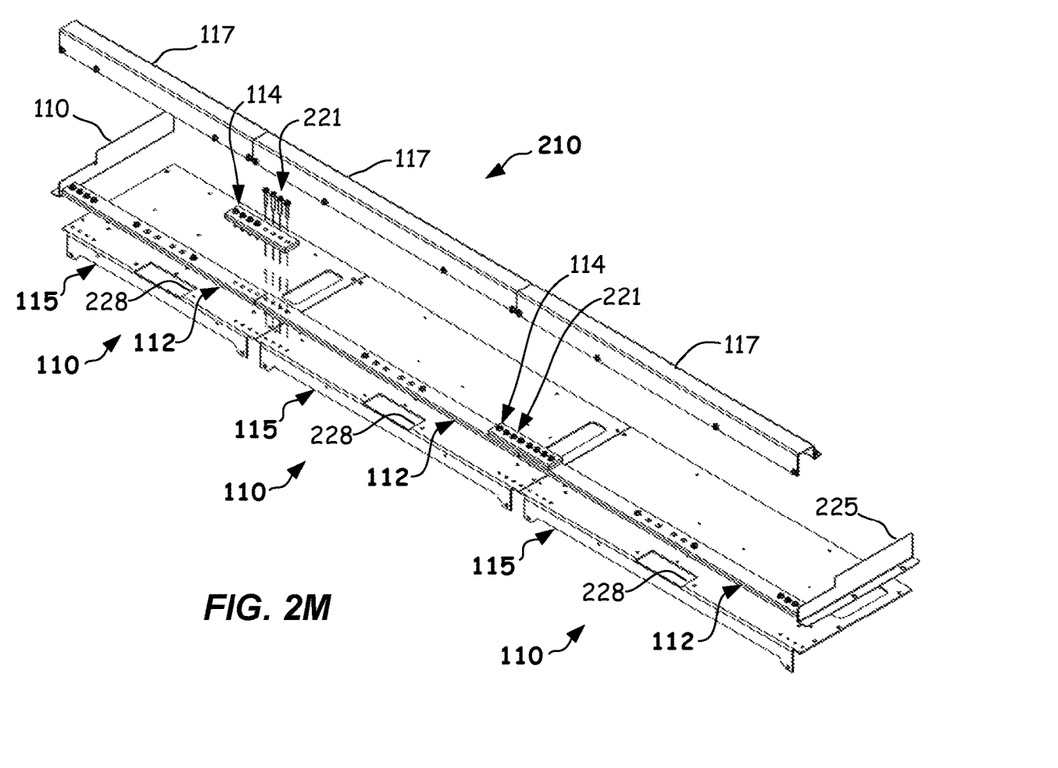

Referring now to FIGS. 2L and 2M, certain sections of a ground bus subassembly 110 can comprise a ground cover 117 covering a ground bus section 112 and can also include an end plate 225 covering an end of the ground cover 117. In FIGS. 2L and 2M, three ground bus subassemblies 110 are assembled into a larger ground bus subassembly 210. A ground cover 117 is provided covering a first ground bus section 112 and a second ground cover 117 is shown covering the second ground bus section 112, and a third ground cover 117 is shown covering a third ground bus section 112. However, in some embodiments the ground cover 117 may be made of a single-length construction spanning multiple sections, such as all three subassemblies 210 of the larger ground bus subassembly 210. End plates 225 can be provided at the right and left ends of the larger ground bus subassembly 210 to close off the ends of the channel formed from the interaction of the first upper front frame plate 115 and the ground cover 117. The channel contains the ground bus sections 112 therein.

In each of the afore-mentioned embodiments, first upper front frame plate 115 is positioned adjacent (side-by-side orientation) to a second upper front frame plate 115 and is effectively coupled to a second upper front frame plate 115, such as by the splice 114. However, in some embodiments, a single piece of ground bus could traverse across two or even more of the upper front frame plates 115 and thus operate to couple them.

Referring now to FIGS. 2E and 2M one or more of the upper front frame plates 115 can comprise a terminal opening 228. The terminal opening 228 (e.g., a hole, such as rectangular hole shown) can be configured to allow connection of a ground terminal 230 (see FIGS. 2F and 2G) to a connection feature 232 of the ground bus section 112. Connection to the connection feature 232 can be by way of grounding fasteners 234 or the like. Cable connector 236 and/or a ground bus terminal block 238 can be connected to the ground terminal 230 to enable one or more cables to be attached thereto. Optionally, the cable connector 236 and/or a ground bus terminal block 238 can be attached directly to the connection feature 232 of the ground bus section 112. As is shown in FIG. 2E, the connection feature 232 can be provided between a first end and a second end of a ground bus section 112. In some embodiments, a connection feature 232 can be provided between a first end and a second end of all of the ground bus sections 112.

FIGS. 2J and 2K illustrate a cabinet section 206 including optional means for connection of various grounds, such as to terminal blocks 238 or via cable connections 236. Terminal blocks 238 or via cable connections 236 can connect to a modified ground terminal 230M, which can be coupled to the ground bus section 112 via grounding fasteners 234, but can also be attached to one or more of the frame members 216V, 216H by a support bracket 240.

Figure 3:
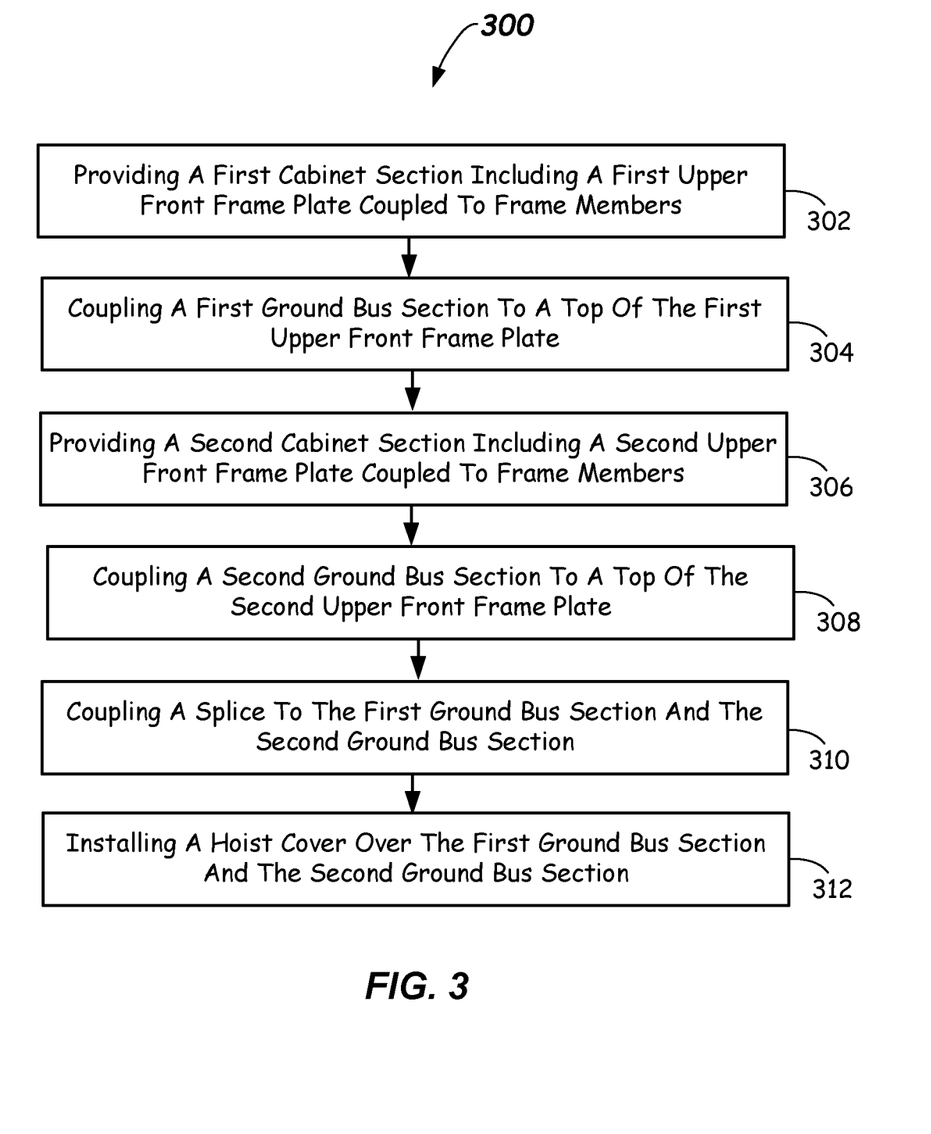
FIG. 3 illustrates a flowchart of a method of assembly of a ground bus subassembly according to embodiments.

Reference is now made to FIG. 3, which illustrates a flowchart of a method of assembly of a ground bus subassembly (e.g., larger ground bus subassembly 210). The method 300 includes, in 302, providing a first cabinet section (e.g., first cabinet section 106, 206) including a first upper front frame plate (e.g., first upper front frame plate 115) coupled to frame members (e.g. frame members 216H and/or 216V), and, in 304, coupling a first ground bus section (e.g., 112) to a top (e.g., top surface 115T) of the first upper front frame plate (e.g., upper front frame plate 115).

The method of assembly 300 further includes, in 306, providing a second cabinet section (e.g., second cabinet section 108) including a second upper front frame plate (e.g., first upper front frame plate 115) coupled to frame members (e.g. frame members 216H and/or 216V).

The method of assembly 300 further includes, in 308, coupling a second ground bus section (e.g., second ground bus section 112) to a top (e.g., top surface 115T) of the second upper front frame plate (e.g., second upper front frame plate). The method 300 further includes, in 310, coupling a splice (e.g., splice 114) to the first ground bus section (e.g., first ground bus section 112) and the second ground bus section first ground bus section 112. Additionally, the method of assembly 300 can comprise, in 312, installing a ground cover (e.g., a ground cover 117 which can function as a hoist rail) over the first ground bus section (e.g., first ground bus section 112) and the second ground bus section (e.g., second ground bus section 112).

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limiting to the particular apparatus, assemblies, systems, and/or methods disclosed, but, to the contrary, the intention is to cover all modifications, equivalents, and alternatives falling within the scope of the claims.

What is claimed is:

1. A ground bus subassembly, comprising:
a first upper front frame plate;
a first ground bus section coupled to the first upper front frame plate; and
a first ground cover covering the first ground bus section, wherein the first ground cover comprises a hoist rail that is configured to support a hoist thereon,
wherein the ground bus subassembly provides a location for a ground bus inside the hoist rail such that the ground bus can be easily accessed from a top front of a cabinet section, and
wherein attachment to the first upper front frame plate at shipping splits is easily accessible without compromising the hoist rail functionality.

2. The ground bus subassembly of claim 1, wherein the first ground cover operatively covers an entire length of the first ground bus section.

3. The ground bus subassembly of claim 1, comprising a splice coupled to one end of the first ground bus section.

4. The ground bus subassembly of claim 3, wherein the splice is coupled to the first ground bus section by fasteners passing through the splice and the first ground bus section and secured to the first upper front frame plate or a corner bracket.

5. The ground bus subassembly of claim 1, comprising a splice coupled to two ends of the first ground bus section.

6. The ground bus subassembly of claim 1, comprising a splice coupled to a first end of the first ground bus section and a second end the first ground bus section directly coupled to the first upper front frame plate by fasteners.

7. The ground bus subassembly of claim 1, comprising a ground cover covering the first ground bus section and an end plate covering an end of the ground cover.

8. The ground bus subassembly of claim 1, comprising a second upper front frame plate adjacent to the first upper front frame plate.

9. The ground bus subassembly of claim 8, comprising a second ground bus section coupled to the second upper front frame plate wherein the coupling is provided by a splice.

10. The ground bus subassembly of claim 9, comprising first fasteners passing through the splice and the first ground bus section and secured to the first upper front frame plate or to a first corner bracket, and second fasteners passing through the splice and the second ground bus section and secured to the second upper front frame plate or to a second corner bracket.

11. The ground bus subassembly of claim 9, comprising a first ground cover covering the first ground bus section and a second ground cover covering the second ground bus section.

12. The ground bus subassembly of claim 1, comprising a terminal opening formed in the first upper front frame plate, the terminal opening configured to allow connection of a ground terminal to a connection feature of the first ground bus section.

13. The ground bus subassembly of claim 12, wherein the connection feature is provided between a first end and a second end of the first ground bus.

14. The ground bus subassembly of claim 12, comprising a ground terminal attached to a connection feature of the first ground bus section.

\* \* \* \* \*